US012194515B2

(12) United States Patent
Chen et al.

(10) Patent No.: US 12,194,515 B2
(45) Date of Patent: Jan. 14, 2025

(54) INVERTING AND CLEANING DEVICE

(71) Applicant: TRUSVAL TECHNOLOGY CO., LTD., Zhunan Township (TW)

(72) Inventors: Shih-Feng Chen, Zhunan Township (TW); Shih-Pao Chien, Zhunan Township (TW)

(73) Assignee: TRUSVAL TECHNOLOGY CO., LTD., Shunan Township (TW)

( * ) Notice: Subject to any disclaimer, the term of this patent is extended or adjusted under 35 U.S.C. 154(b) by 477 days.

(21) Appl. No.: 17/680,166

(22) Filed: Feb. 24, 2022

(65) Prior Publication Data

US 2023/0264239 A1 Aug. 24, 2023

(51) Int. Cl.
*B08B 9/08* (2006.01)
*B08B 13/00* (2006.01)
*B65G 15/60* (2006.01)

(52) U.S. Cl.
CPC .......... *B08B 9/0821* (2013.01); *B08B 9/0813* (2013.01); *B08B 13/00* (2013.01); *B65G 15/60* (2013.01); *B08B 2209/08* (2013.01)

(58) Field of Classification Search
CPC ..... B08B 9/0821; B08B 9/0813; B08B 13/00; B08B 2209/08; B65G 15/60
USPC ....................................................... 134/152
See application file for complete search history.

(56) References Cited

U.S. PATENT DOCUMENTS

2015/0101286 A1\* 4/2015 Clarkson ............... B08B 9/0826
53/426

FOREIGN PATENT DOCUMENTS

| CN | 103357629 A | \* 10/2013 |
| CN | 112337922 A | 2/2021 |
| TW | M627278 U | 5/2022 |

OTHER PUBLICATIONS

CN103357629A—machine translation (Year: 2013).\*
Search Report for TW110146014, Issued on Jun. 1, 2022, Total of 1 page.
Translation of Abstract of CN112337922, Total of 1 page.
Translation of Abstract of CN103357629, Total of 1 page.
Translation of Abstract of TWM627278, Total of 1 page.

\* cited by examiner

*Primary Examiner* — Tinsae B Ayalew
(74) *Attorney, Agent, or Firm* — Apex Juris, pllc; Hilde Coeckx

(57) ABSTRACT

An inverting and cleaning device includes a positioning mechanism, an inverting mechanism, and a cleaning mechanism. The positioning mechanism is adapted to move a drum to a first position. The inverting mechanism includes a holding member. When the drum is located at the first position, the holding member clamps a drum body of the drum and inverts the drum to a second position where an opening on a top of the drum faces downward. The cleaning mechanism includes a cleaning tool. When the drum is located at the second position, the cleaning tool enters the drum through the opening of the drum for cleaning an inside of the drum.

8 Claims, 6 Drawing Sheets

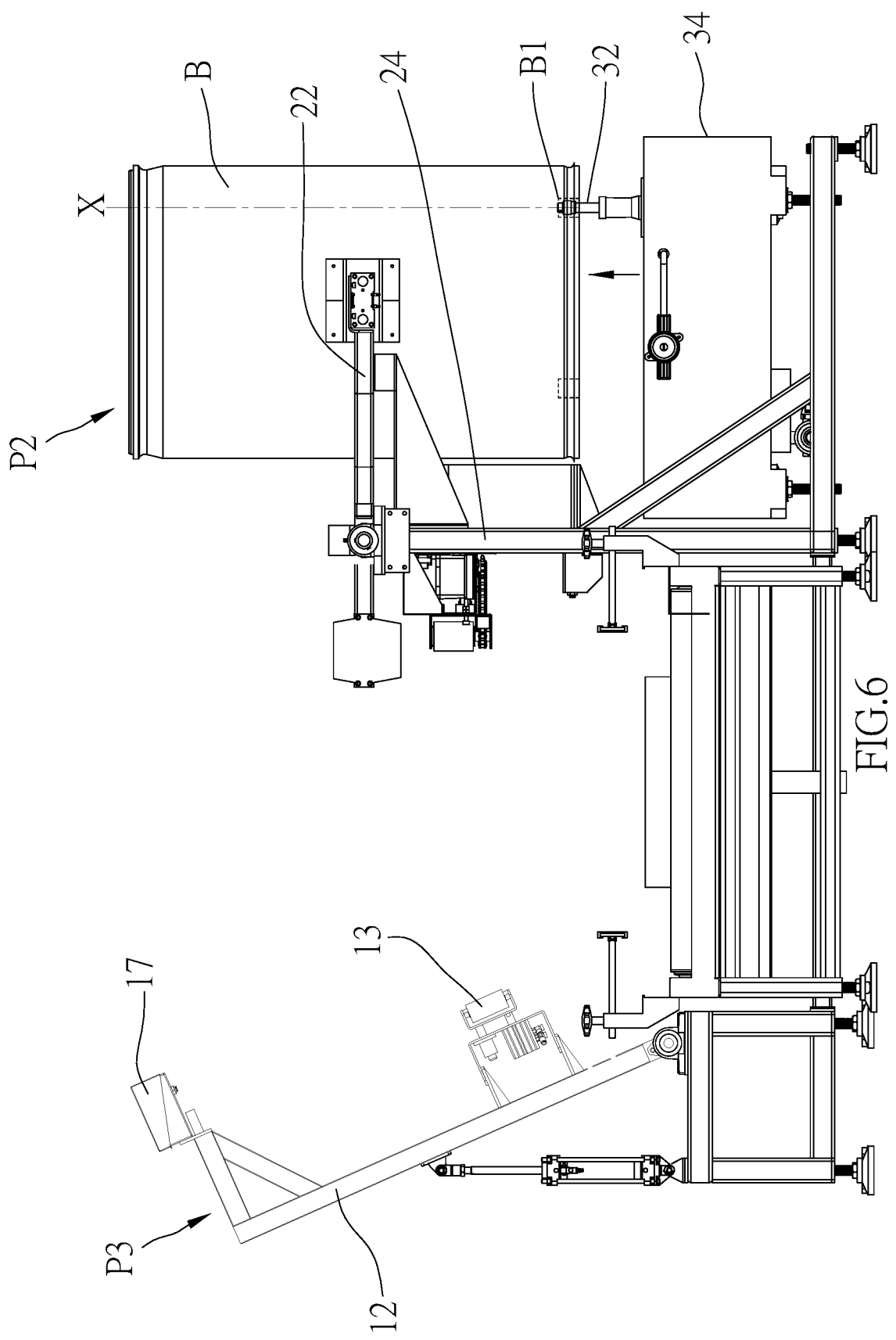

INVERTING AND CLEANING DEVICE

BACKGROUND OF THE INVENTION

Technical Field

The present invention relates generally to a cleaning device, and more particularly to an inverting and cleaning device.

Description of Related Art

Typically, general chemicals must be contained in specific chemical containers for use. When the chemicals in the chemical containers are used up, the empty chemical containers must be cleaned first to facilitate subsequent refilling of chemicals or to avoid polluting the environment while recycling and remaking.

At present, most of the chemical containers are cleaned manually. Taking a chemical drum as an example, to completely remove the residual chemicals in the chemical drum, the cleaning staff has to lift one side of the chemical drum to dump the residual chemicals in the chemical drum and rinse the chemical drum. However, a lot of manpower and time needs to be taken to clean large chemical drums with a heavy weight that are bulk and are not conducive to handling or turning over. Additionally, it is hard to maintain the consistency of cleaning quality when cleaning chemical containers manually. Therefore, there is a need for manufacturers to develop a cleaning device facilitating cleaning chemical containers.

BRIEF SUMMARY OF THE INVENTION

In view of the above, the primary objective of the present invention is to provide an inverting and cleaning device, which could invert a drum to facilitate dumping the residual chemicals in the drum and rinsing the drum.

The present invention provides an inverting and cleaning device including a positioning mechanism, an inverting mechanism, and a cleaning mechanism, wherein the positioning mechanism is adapted to move a drum to a first position. The inverting mechanism includes a holding member, wherein when the drum is located at the first position, the holding member clamps a drum body of the drum and inverts the drum to a second position where an opening on a top of the drum faces downward. The cleaning mechanism includes a cleaning tool, wherein when the drum is located at the second position, the cleaning tool enters the drum through the opening for cleaning an inside of the drum.

With the aforementioned design, the inverting and cleaning device could automatically invert the drum to pour out the residual chemicals in the drum, and the cleaning mechanism could clean the inside of the drum to remove the residual chemicals inside the drum, not only achieving an effect of saving manpower and time costs but also maintaining the consistency of cleaning quality.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 6 is a side view of the inverting and cleaning device according to the embodiment of the present invention.

DETAILED DESCRIPTION OF THE INVENTION

Figure 1:
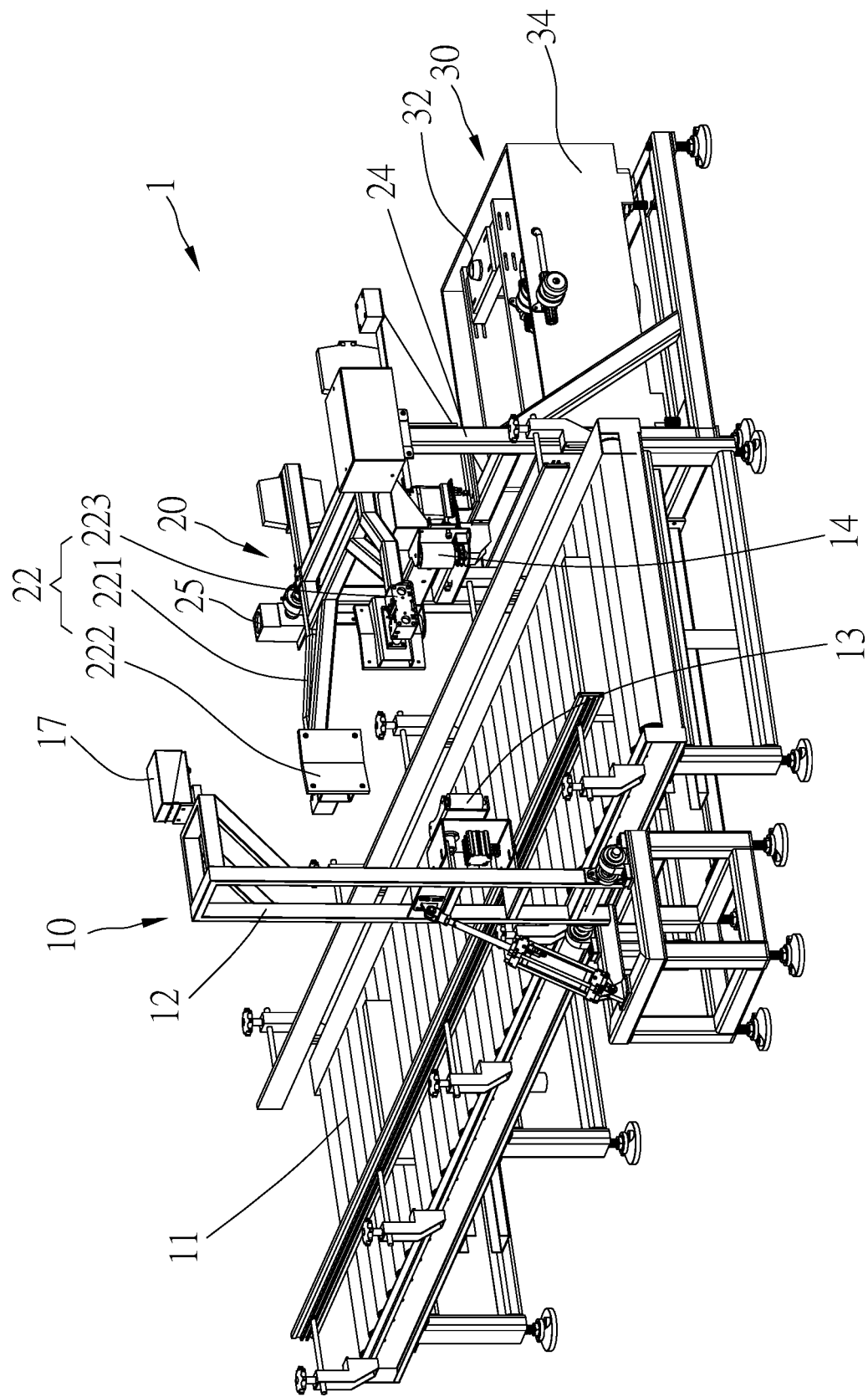
FIG. 1 is a perspective view of the inverting and cleaning device according to an embodiment of the present invention.
Figure 2:
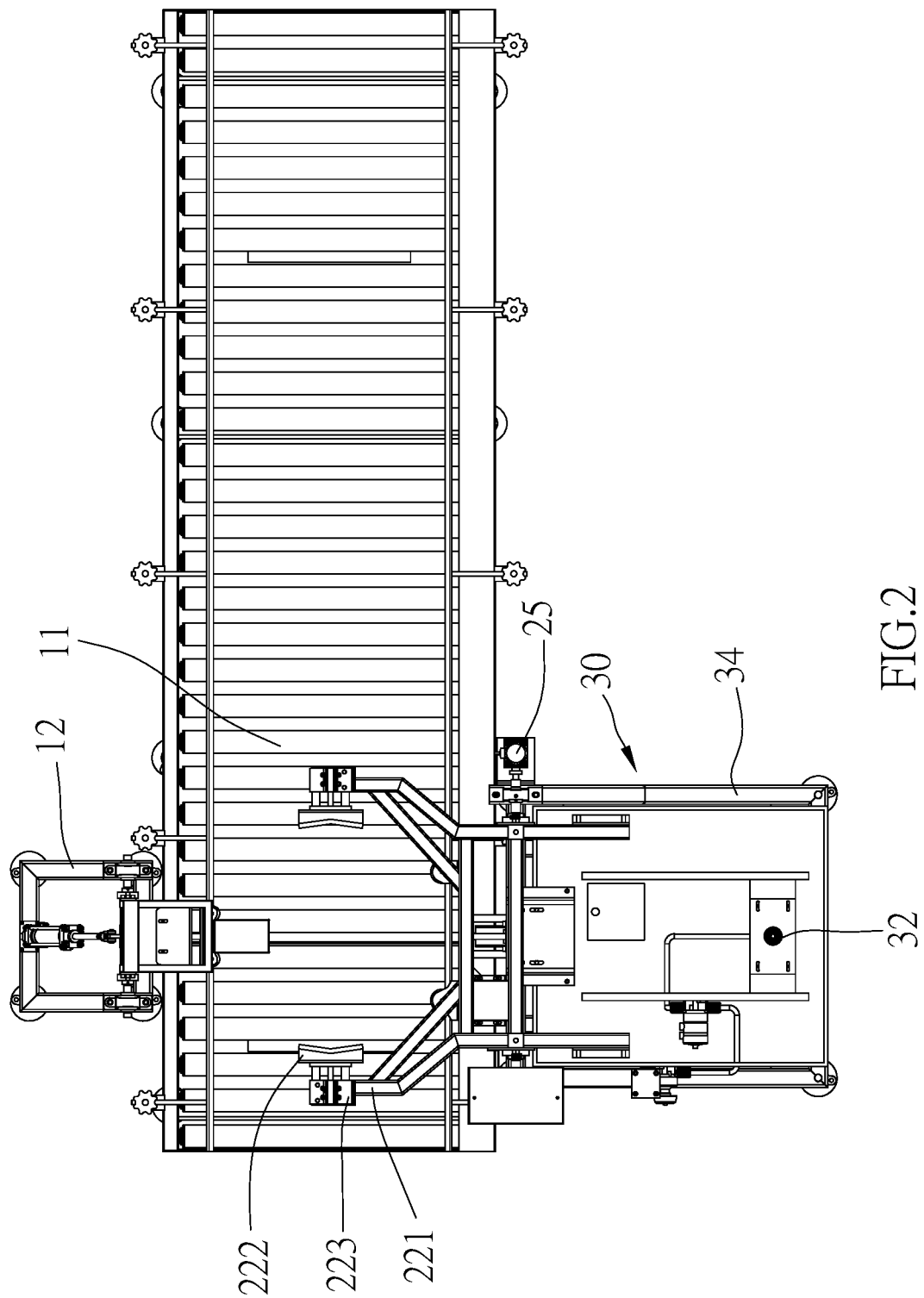
FIG. 2 is a top view of the inverting and cleaning device according to the embodiment of the present invention.
Figure 3:
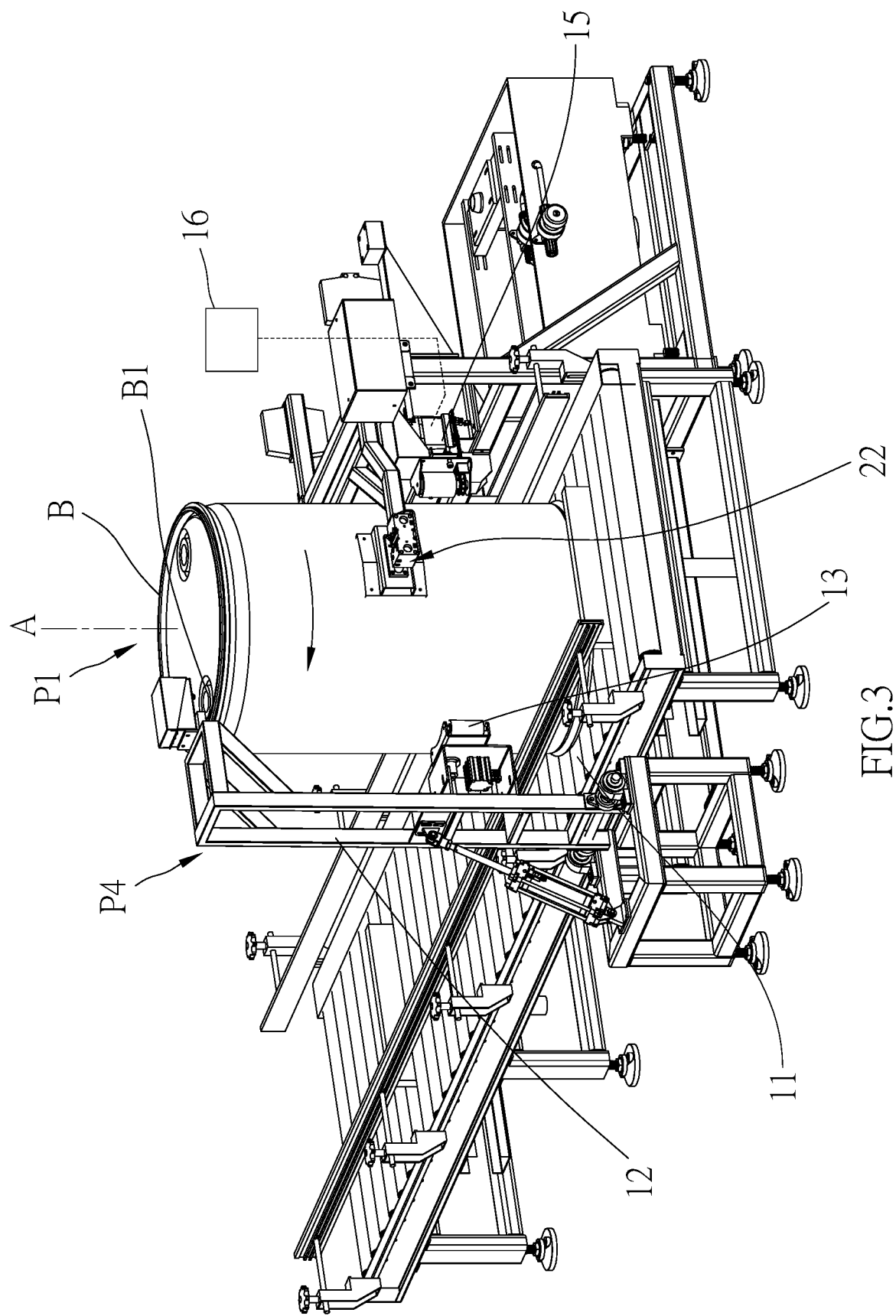
FIG. 3 is a perspective view of the inverting and cleaning device according to the embodiment of the present invention.

An inverting and cleaning device 1 according to an embodiment of the present invention is illustrated in FIG. 1 to FIG. 6 and includes a positioning mechanism 10, an inverting mechanism 20, and a cleaning mechanism 30.

The positioning mechanism 10 is adapted to move a drum B to a first position P1. The inverting mechanism 20 includes a holding member 22. When the drum B is located at the first position P1, the holding member 22 holds a drum body of the drum B and inverts the drum B to make an opening B1 on a top of the drum B face downward to be located at a second position P2.

The positioning mechanism 10 includes a conveyor belt 11, a positioning frame 12, a first roller 13, and a second roller 14, wherein the conveyor belt 11 is adapted to convey the drum B. The first roller 13 is disposed on the positioning frame 12. The positioning frame 12 and the second roller 14 are respectively disposed on two lateral sides of the conveyor belt 11. The positioning frame 12 is controllable to pivot between a third position P3 and a fourth position P4, wherein when the positioning frame 12 is located at the third position P3, the first roller 13 does not in contact with the drum B, while when the positioning frame 12 is located at the fourth position P4, the first roller 13 is in contact with a side of the drum B and pushes the drum B to make another side of the drum B be in contact with the second roller 14. The first roller 13 is turnable around a vertical reference axis and the second roller 14 is turnable around another vertical reference axis. In this way, the second roller 14 could be driven by a driving member 15 to turn and drive the drum B to turn around an axis A on the conveyor belt 11.

For instance, when the drum B has not been conveyed to a position close to the positioning frame 12, the positioning frame 12 is controlled to pivot away from the conveyor belt 11 to the third position P3; when the drum B is conveyed to a position close to the positioning frame 12 through the conveyor belt 11, the positioning frame 12 is controlled to pivot toward the conveyor belt 11 to the fourth position P4, which makes the first roller 13 disposed on the positioning frame 12 be in contact with a side of the drum B at the same time and pushes the drum B toward the second roller 14, thereby holding the drum B between the first roller 13 and the second roller 14. In this way, when the second roller 14 is driven by the driving member 15 that is a motor as an example, the drum B is driven by the second roller 14 to spin on the conveyor belt 11; at the same time, the second roller 14 could also rotate with the drum B passively to assist the drum B to rotate stably.

The positioning mechanism 10 includes a controller 16 and a sensor 17, wherein the controller 16 is electrically connected to the driving member 15 and the sensor 17. The sensor 17 is disposed on the positioning frame 12. When the positioning frame 12 is located at the fourth position P4, the sensor 17 is located on the top of the drum B and detects a position of the opening of the drum B during a turning process of the drum B, wherein when the sensor 17 detects that the opening B1 of the drum B is located at a predetermined position, the controller 16 controls the driving member 15 stop operating to stop the drum B from turning to be located at the first position P1.

The inverting mechanism 20 includes a support 24 and a driving motor 25. The holding member 22 includes two holding arms 221, two clamping members 222, and two cylinders 223, wherein an end of each of the holding arms 221 is connected to the support 24, and each of the cylinders 223 is disposed on another end of one of the holding arms 221. Each of the clamping members 222 is connected to one of the cylinders 223 and is driven by the corresponding cylinder 223 to change a distance between the two clamping members 222, wherein the two holding arms 221 could be driven by the driving motor 25 to pivot relative to the support 24. When the drum B is located at the first position P1, the holding member 22 could clamp the drum body of the drum B and turn the drum B over, so that the opening B1 on the top of the drum B faces downward to be located at the second position P2. In the current embodiment, the holding member 22 clamps the drum body of the drum B and reverses the drum B by 180 degrees from the first position P1 to the second position P2.

Figure 4:
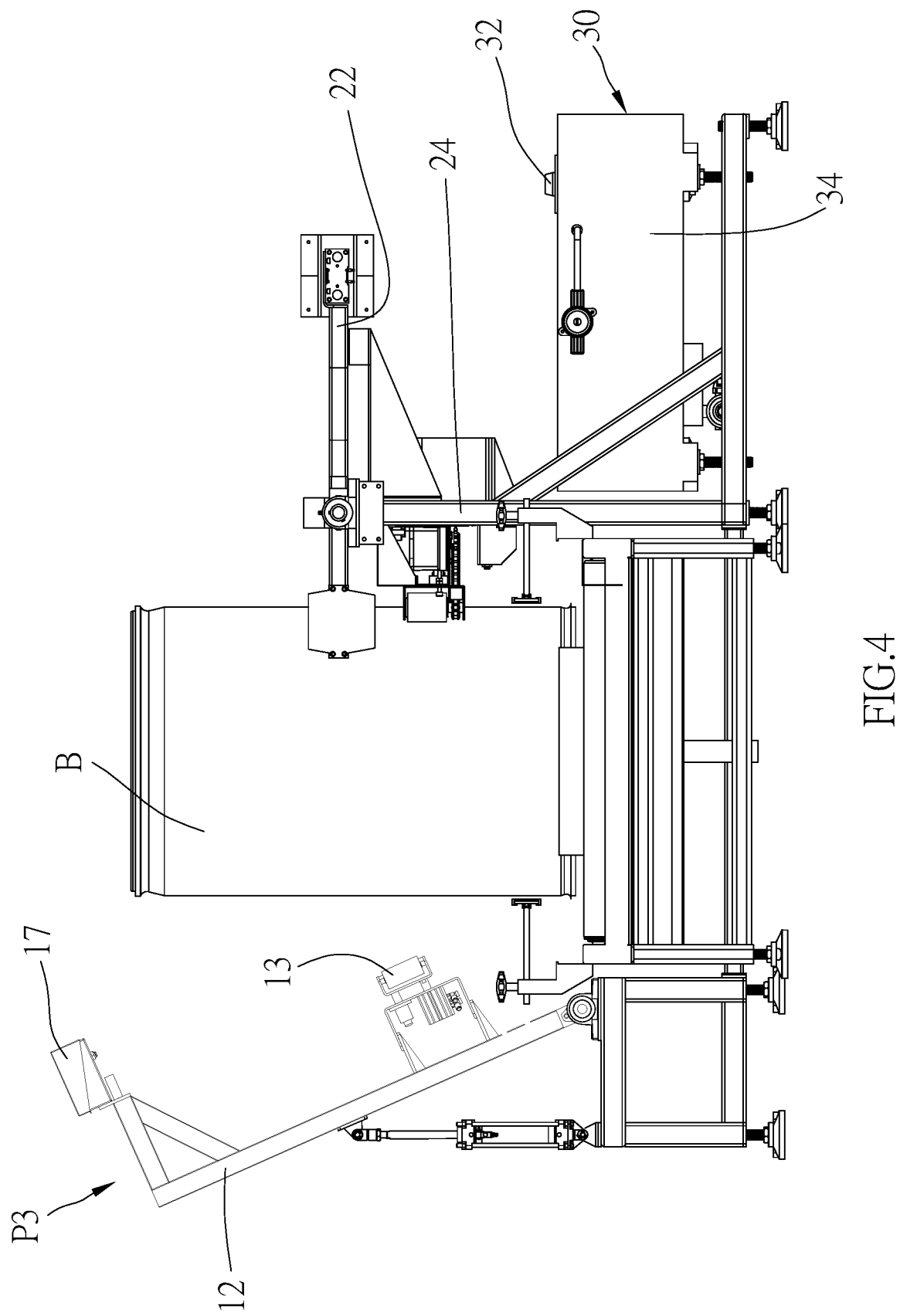
FIG. 4 is a side view of the inverting and cleaning device according to the embodiment of the present invention.
Figure 5:
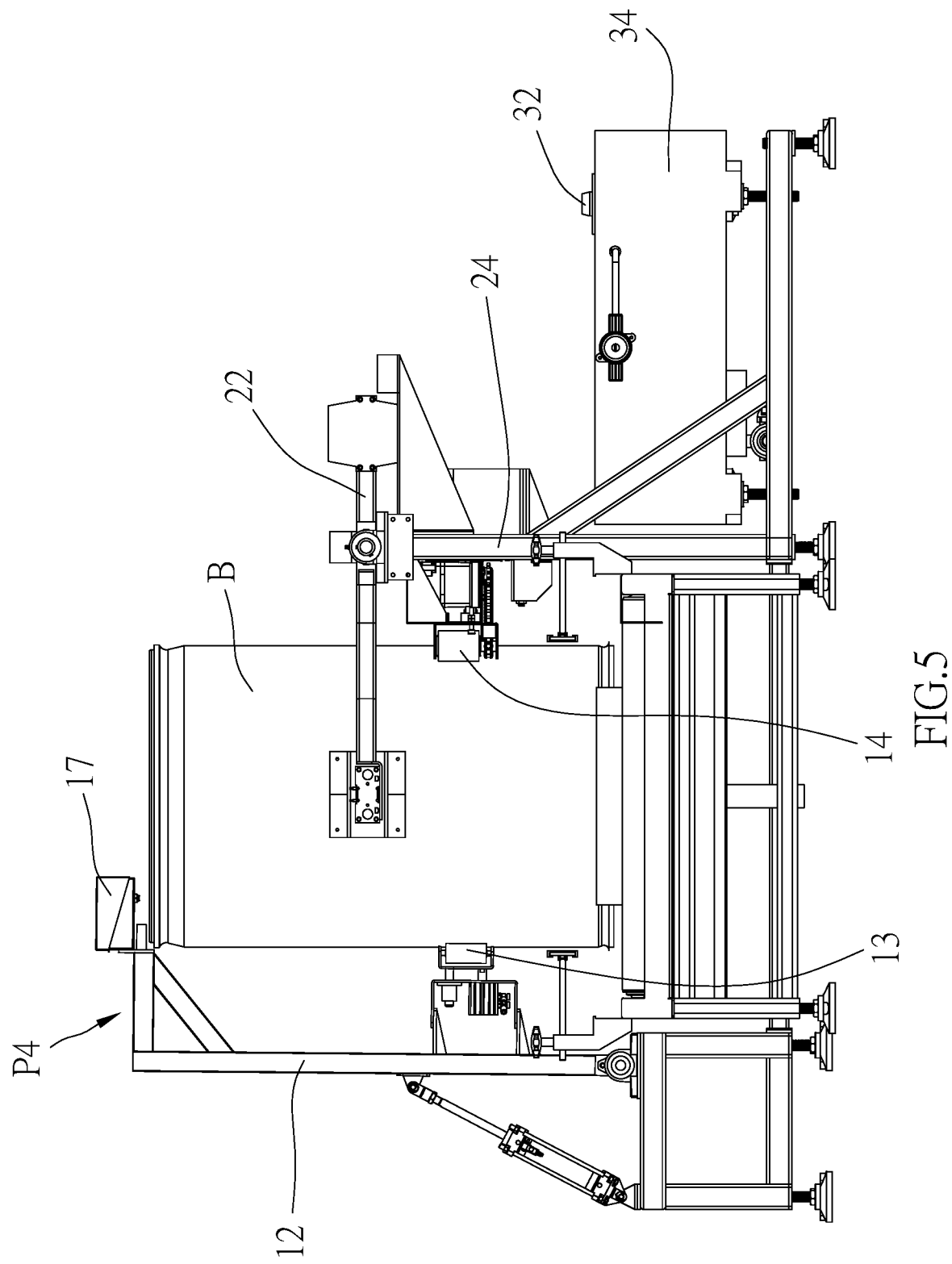
FIG. 5 is a side view of the inverting and cleaning device according to the embodiment of the present invention.

For instance, referring to FIG. 4, when the drum B has not been conveyed by the conveyor belt 11 to a position close to the positioning frame 12, the two holding arms 221 could be driven by the driving motor 25 to pivot relative to the support 24 to a position away from the conveyor belt 11; referring to FIG. 5, when the drum B is conveyed by the conveyor belt 11 to a position close to the positioning frame 12, the two holding arms 221 are driven by the driving motor 25 to pivot relative to the support 24 to a position close to the conveyor belt 11 and are respectively located on two lateral sides of the drum B; when the drum B is located at the first position P1, the two clamping members 222 are driven by the two cylinders 223 to clamp the drum B between the two clamping members 222, at this time, referring to FIG. 6, the positioning frame 12 could be controlled to pivot away from the conveyor belt 11 to the third position P3; then, the two holding arms 221 could be driven by the driving motor 25 to pivot relative to the support 24, thereby reverse the drum B by 180 degrees from the first position P1 to the second position P2.

The cleaning mechanism 30 includes a cleaning tool 32 and a lifting driving member. When the drum B is located at the second position P2, the cleaning tool 32 and the opening B1 of the drum B are located on a same vertical axis X, so that the cleaning tool 32 could enter the drum B via the opening B1 to clean an inside of the drum B. Additionally, the cleaning tool 32 could be driven by the lifting driving member to move up and down along the vertical axis X. The cleaning tool 32 includes a liquid spray head and a gas spray head for respectively outputting liquid or gas.

With the positioning mechanism 10, when the inverting mechanism 20 inverts the drum B from the first position P1 to the second position P2, the opening B1 on the top of the drum B and the cleaning tool 32 could be located exactly on the same vertical axis X. In this way, when the cleaning tool 32 is driven by the lifting driving member to move upward along the vertical axis X, the cleaning tool 32 could smoothly enter the inside of the drum B, and spray liquid water through the liquid spray head to remove the residual chemicals inside the drum B, and then remove the residual liquid inside the drum B through pressurized gas sprayed from the gas spray head. Additionally, the cleaning tool 32 further includes a drain tank 34 having an opening facing the opening B1 on the top of the drum B located at the second position P2, thereby the residual chemical or cleaning liquid discharged from the opening B1 of the drum B could be collected in the drain tank 34 and discharged through the drain tank 34.

In the current embodiment, the cleaning tool 32 is movable as an example for illustration (i.e., moving relative to the drum B to make the cleaning tool 32 enter the inside of the drum B). In other embodiments, the drum B could be movable relative to the cleaning tool 32 to make the cleaning tool 32 enter the inside of the drum B. For example, the inverting and cleaning device 1 could include a lifting mechanism connected to the inverting mechanism 20, wherein the lifting mechanism could drive the inverting mechanism 20 to move up and down. In other words, when the drum B is located at the second position P2, the lifting mechanism could drive the inverting mechanism 20 to move downward to make the cleaning tool 32 enter the inside of the drum B through the opening B1 of the drum B for cleaning, thereby the purpose of removing the residual chemicals inside the drum B through the cleaning tool 32 could also be achieved.

With the aforementioned design, the inverting and cleaning device 1 could automatically invert the drum B to pour out the residual chemicals in the drum B, and the positioning mechanism 10 could make the cleaning mechanism 30 enter the inside of the drum B through the opening B1 on the top of the drum B to remove the residual chemicals inside the drum B, not only achieving an effect of saving manpower and time costs but also maintaining the consistency of cleaning quality.

It must be pointed out that the embodiments described above are only some preferred embodiments of the present invention. All equivalent structures which employ the concepts disclosed in this specification and the appended claims should fall within the scope of the present invention.

What is claimed is:
1. An inverting and cleaning device, comprising:
a positioning mechanism adapted to move a drum to a first position;
an inverting mechanism comprising a holding member, wherein when the drum is located at the first position, the holding member clamps a drum body of the drum and inverts the drum to a second position where an opening on a top of the drum faces downward; and
a cleaning mechanism comprising a cleaning tool, wherein when the drum is located at the second position, the cleaning tool enters the drum through the opening for cleaning an inside of the drum;
wherein the positioning mechanism comprises a conveyor belt, a positioning frame, a first roller, and a second roller; the conveyor belt is adapted to convey the drum; the first roller is disposed on the positioning frame; the positioning frame and the second roller are respectively disposed on two lateral sides of the conveyor belt; the positioning frame is controllable to pivot between a third position and a fourth position; when the positioning frame is located at the third position, the first roller is not in contact with the drum; when the positioning frame is located at the fourth position, the first roller is in contact with a side of the drum to make another side of the drum be in contact with the second roller; the second roller is driven by a driving member to spin to drive the drum to turn around an axis.

2. The inverting and cleaning device as claimed in claim 1, wherein the positioning mechanism comprises a controller and a sensor; the controller is electrically connected to the driving member and the sensor; the sensor is disposed on the positioning frame; when the positioning frame is located at the fourth position, the sensor is located on the top of the drum and is adapted to detect a position of the opening of the drum during a turning process of the drum; when the sensor detects that the opening of the drum is located at a predetermined position, the controller stops the operation of the driving member to hold the drum in the first position.

3. The inverting and cleaning device as claimed in claim 1, wherein the holding member clamps the drum body of the drum and inverts the drum by 180 degrees from the first position to the second position.

4. The inverting and cleaning device as claimed in claim 1, wherein the cleaning mechanism comprises a lifting driving member; when the drum is located at the second position, the cleaning tool and the opening of the drum are both located on a vertical axis; the cleaning tool is driven by the lifting driving member to move up and down along the vertical axis.

5. The inverting and cleaning device as claimed in claim 4, wherein the cleaning tool comprises a liquid spray head and a gas spray head.

6. The inverting and cleaning device as claimed in claim 1, wherein the inverting mechanism comprises a support; the holding member comprises two holding arms, two clamping members, and two cylinders; an end of each of the holding arms is connected to the support; each of the cylinders is disposed on another end of one of the holding arms; each of the clamping members is connected to one of the cylinders; the clamping members are driven by the cylinders to change a distance between the clamping members.

7. The inverting and cleaning device as claimed in claim 6, wherein the inverting mechanism comprises a driving motor; the holding arms are driven by the driving motor to pivot relative to the support.

8. The inverting and cleaning device as claimed in claim 1, further comprising a lifting mechanism connected to the inverting mechanism, wherein the lifting mechanism is adapted to drive the inverting mechanism to move up and down; when the drum is located at the second position, the lifting mechanism drives the inverting mechanism to move downward to make the cleaning tool enter the drum through the opening of the drum.

* * * * *